(12) United States Patent
Gutmann

(10) Patent No.: US 8,752,447 B2
(45) Date of Patent: Jun. 17, 2014

(54) GEAR PAIR WITH INTERSECTING AXES

(75) Inventor: Peter Gutmann, Munich (DE)

(73) Assignee: Thyssenkrupp Prazisionsschmiede GmbH, Munich (DE)

( * ) Notice: Subject to any disclaimer, the term of this patent is extended or adjusted under 35 U.S.C. 154(b) by 1417 days.

(21) Appl. No.: 11/814,402

(22) PCT Filed: Feb. 1, 2006

(86) PCT No.: PCT/EP2006/000874
§ 371 (c)(1),
(2), (4) Date: Jul. 20, 2007

(87) PCT Pub. No.: WO2006/082038
PCT Pub. Date: Aug. 10, 2006

(65) Prior Publication Data
US 2008/0092685 A1     Apr. 24, 2008

(30) Foreign Application Priority Data
Feb. 2, 2005   (DE) .......................... 10 2005 005 169

(51) Int. Cl.
*F16H 55/00*     (2006.01)

(52) U.S. Cl.
USPC .......................................................... 74/462

(58) Field of Classification Search
USPC ........ 74/416, 417, 457, 458, 459.5, 460, 462; 29/893.3, 893.35
See application file for complete search history.

(56) References Cited

U.S. PATENT DOCUMENTS

| 4,651,587 | A | 3/1987 | Anderson et al. | |
|---|---|---|---|---|
| 2003/0140718 | A1* | 7/2003 | Nett | 74/416 |
| 2005/0274216 | A1* | 12/2005 | Fleytman | 74/457 |

FOREIGN PATENT DOCUMENTS

| DE | 2446172 A1 | 4/1976 |
|---|---|---|
| DE | 2616765 A1 | 10/1976 |
| JP | 63152767 A * | 6/1988 |
| JP | 2001248710 A * | 9/2001 |

OTHER PUBLICATIONS

International Search Report and Written Opinion dated Apr. 5, 2006 from the corresponding PCT/EP2006/000874 in English.
International Written Opinion from the corresponding PCT/EP2006/000874.

* cited by examiner

*Primary Examiner* — Phillip A Johnson
(74) *Attorney, Agent, or Firm* — Katten Muchin Rosenman LLP

(57) ABSTRACT

A method for establishing the gearing geometries of a gear pairing of two gears with intersection axes comprises the following steps: predetermining a first gearing geometry of a virtual first gear; calculating the geometry of the gearing of a virtual second gear, this geometry resulting during conjugated creation from a roll-off process of a tooth (1) of the predetermined geometry of the virtual first gear, whereby the roll-off process of the tooth (1) of the virtual first gear, this roll-off process underlying the calculation, is ended in the symmetrical position thereof in the tooth gap (3) of the second virtual tooth; calculating the tooth face geometry of the teeth of the first gear, this tooth face geometry resulting during the reverse conjugated creation, while underlying a full roll-off process of a tooth of the virtual second gear with the first; establishing the final geometry of the gearing of the first gear according to the tooth face geometry of the gearing of the first gear, this tooth face geometry having been calculated in the previous step, and; establishing the final geometry of the gearing of the second gear according to the previously calculated tooth face geometry of the gearing of the virtual second gearing.

5 Claims, 3 Drawing Sheets

GEAR PAIR WITH INTERSECTING AXES

Figure 1A:
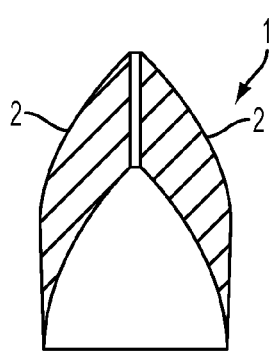

The present invention relates to a method for defining the toothing geometries of a gear pair comprising two gears with intersecting axes, especially a gear pair comprising crown gear and pinion. The present invention also relates to a gear pair comprising crown gear and pinion with toothings of mutually conjugate form.

In the prior art, there has been widely used, to define the geometries of the toothings of a gear pair comprising crown gear and pinion, a method based on numerical design, wherein the exact geometry of one of the partners of the gear pair is predesignated and a complete cycle of rolling of the pinion over the crown gear is simulated, whereby the geometry of the toothing of the other partner of the gear pair can be defined. This method is known as "conjugate generation". A good overview of the related prior art can be found in the book entitled "Development of Gear Technology and Theory of Gearing" by Faydor L. Litvin, NASA (National Aeronautics and Space Administration) from 1997. A gear pair comprising crown gear and pinion or two bevel-toothed gears and defined in this way can then be generated by means of known chip-removing and/or forming manufacturing methods from the knowledge of the exact toothing geometries of both gears. For this purpose, however, the toothing geometry of one of the partners of the gear pair must always be predesignated exactly.

According to the known prior art, cylindrical geometry of the pinion toothing, wherein the tooth flanks of the pinion teeth have a linear shape over the axial width of the teeth, is usually assumed in the case of a gear pair comprising crown gear and pinion.

To define advantageous toothing geometries of a gear pair comprising crown gear and pinion, however, there has also been proposed already for the pinion teeth a more complex geometry, in which the standard cylindrical toothing geometry is abandoned in order to reduce the undercut that would otherwise develop at the tooth flanks of the crown-gear teeth. For example, it has been proposed for this purpose that the tooth-flank load-bearing capacity of the crown-gear teeth be improved by providing the pinion teeth with a pressure-angle and/or profile-displacement variation over the axial width thereof. In this connection, an undercut of the crown-gear teeth can also be further reduced advantageously with a tip shortening that increases over the axial width of the pinion teeth. Here also the tooth flanks of the pinion teeth have a geometry that is always characterized by a linear shape in axial direction.

The method of conjugate generation has already proved to be less than optimal for defining the aforesaid more complex toothing geometries, since the exact geometry of one of the partners of the gear pair must already be known for this purpose in each case. Thus optimization and definition of the toothing geometry frequently necessitate numerous computing runs, in order to approximate the desired geometric characteristics by varying the most diverse toothing parameters of a gear pair.

It is therefore the object of the present invention to provide a method for defining the toothing geometries of a gear pair comprising two gears with intersecting axes, especially a gear pair comprising crown gear and pinion, wherein optimal toothing geometries for crown gear and pinion can be defined with low computational effort to achieve the greatest possible tooth-flank load-bearing capacity of the crown-gear teeth and the highest possible operating strength of the toothing on the whole. Another object is to provide a gear pair comprising crown gear and pinion, wherein the toothing geometries of mutually conjugate form are advantageously superior to the prior art in terms of operating strength of the gear pair.

This object is achieved for a gear pair comprising two gears with beveled toothing by a method according to independent claims 1 or 2. Although the inventive method—subject to certain secondary conditions—is suitable for arbitrary gear pairs with intersecting axes, the method and its advantages will be explained hereinafter on the basis of the embodiment according to claim 3, according to which the gear pair is one comprising crown gear and pinion having axes that intersect at an angle of 90°. According to the invention, there is first predesignated a first toothing geometry of a "virtual" pinion, which is intended to serve as the starting basis for the subsequent steps of calculating and defining the toothings. Starting from this predesignated toothing geometry of the virtual pinion, there is calculated the toothing geometry of a "virtual" crown gear that results from a cycle of rolling of the virtual pinion in conjugate generation. In a departure from the prior art method of conjugate generation, only a "half" rolling cycle of the virtual pinion is used as basis instead of a complete rolling cycle, which introduced an undercut of the tooth flanks of the crown gear. For this purpose, the calculation of the tooth-flank geometry of the virtual crown gear resulting from the rolling cycle is ended at the point at which the tooth of the virtual pinion used as reference for calculating the tooth flanks during the rolling cycle is in the symmetric position in the tooth gap of the virtual crown gear. Because of the early termination of conjugate generation, there is calculated in this way the geometry of a tooth flank of a tooth of a virtual crown gear on which the predesignated virtual pinion tooth can roll halfway. Thereby the calculated tooth flank is mathematically represented as the envelope of the virtual pinion tooth after it has rolled halfway. The corresponding mating flank is then generated either by reflecting the half-rolled, undercut-free tooth flank or by assuming a further half rolling cycle in opposite running direction. The two tooth flanks of each tooth of the virtual crown gear then have mutually symmetric geometry—starting from a toothing geometry of the virtual pinion that is symmetrically predesignated for both running directions. It is expressly pointed out that the predesignated virtual pinion cannot roll completely on the calculated virtual crown gear.

Starting from the toothing geometry of the virtual crown gear, in which, by virtue of the underlying calculation procedure using only half of a rolling cycle, the tooth flanks do not have any undercut, the geometry of both tooth flanks of a pinion tooth satisfying the toothing law is then calculated by means of reverse conjugate generation. In the process, it is possible that excessive tapering of the (separately) calculated tooth flanks of the pinion may occur in the region of the pinion toothing located at the radially inner end—relative to the revolution of the pinion on the crown gear, meaning that the two tooth flanks of a pinion tooth intersect. In this case the region of the two tooth flanks located above the line of intersection—relative to the height of the tooth—is technically meaningless; the resulting excessive tapering is avoided with appropriate shortening of the tooth flanks, resulting in a corresponding shortening of the tooth tip. The pinion-toothing geometry obtained in this way is then defined as the final geometry of the pinion toothing. In extremely advantageous manner, a pinion tooth created in this way therefore has a tip shortening at the radially inner end relative to its revolution on the crown gear; in contrast to the pinion toothings known heretofore, whose tooth flanks have axially linear shape, the tooth flanks of the pinion tooth having the geometry defined with the inventive method have a shape that is not linear over the entire axial width but instead is curved.

According to the first variant of the method according to claim 1, the toothing geometry of the virtual crown gear can then be defined as the final geometry of the crown-gear toothing. The pinion, whose geometry has already been finally defined, was indeed obtained directly from reverse conjugate generation, and so, according to the invention, two mutually conjugate gears have been defined.

Alternatively, as the last step of the inventive method according to claim 2, and starting from the pinion whose geometry was finally defined on the basis of a complete pinion rolling cycle, there can be calculated, by means of conjugate generation, the geometry of a crown-gear toothing; this is then defined as the final geometry of the crown-gear toothing. This last step is used as it were to check the previous calculation steps, since the resulting and defined geometry of the crown-gear toothing must correspond substantially to that of the previously calculated virtual crown gear.

The net effect according to the invention is therefore that the toothing geometry of a gear pair comprising crown gear and pinion has been defined in a manner that completely avoids an undercut of the tooth flanks of the crown gear. The tooth flanks of the crown gear teeth, whose geometry has been optimally defined by the method, have high load-bearing capacity. The pinion teeth—and therefore the gear pair as a whole—have been advantageously designed for the greatest possible operating strength, especially by virtue of the fact that their tooth flanks are curved in axial direction.

Obviously the method is not limited merely to defining the geometry of a gear pair comprising crown gear and pinion. To the contrary, as already mentioned hereinabove, it can be applied for arbitrary gear pairs with intersecting axes, if an undercut that may develop on one of the two gears is to be avoided. In particular, the method can therefore also be applied to gear pairs in which the gear axes intersect at an angle different from 90°. Even in such cases the inventive method permits rapid and optimal definition of the toothing geometries that are advantageous for the purpose.

In a further preferred configuration of the inventive method, the pinion-toothing geometry to be predesignated has a constant tooth height as well as a variation of the pressure angle and/or of the profile displacement over the axial width of the teeth. Such a pinion-toothing geometry, which is already advantageous and deviates from the cylindrical tooth form that has been standard heretofore, is therefore further optimized in extremely advantageous manner. The tip shortening developing on the pinion is advantageously limited to the minimum extent necessary to avoid an undercut.

Particularly advantageously, the method is applied to a gear pair comprising crown gear and pinion with an axis intersection angle of 90°, wherein there is no axis offset between crown gear and pinion and the pinion has straight toothing. A gear pair exhibiting the aforesaid characteristics is preferably suitable precisely as a component of a differential gear mechanism subjected to high loads, in which case the gear pair needs advantageously optimal characteristics in terms of its operating strength. However, this should not be construed as a limitation, since the present method is also applicable in particular to crown-gear/pinion pairs with helical toothing.

Finally, the present invention also relates to a gear pair comprising crown gear and pinion with toothings of mutually conjugate form, characterized in that the pinion teeth have, over their width, a tip shortening that increases radially inward relative to the revolution of the pinion on the crown gear, while the tooth flanks of the pinion teeth are curved over their width. This gear pair is therefore characterized by those features that appear in the inventive method; it is distinguished from the already known prior art in extremely advantageous manner, by the fact that the pinion teeth have an increasing tip shortening over their axial width as well as a curved shape of their tooth flanks.

Starting from the curved shape of the tooth flanks of the pinion teeth over the axial tooth width and from the tip shortening found at the radially inner end relative to the revolution of the pinion on the crown gear, a gear pair optimized in terms of high operating strength is obtained by conjugate generation of the crown-gear toothing. According to an advantageous embodiment of the inventive gear pair, it can then be further provided that the tooth flanks of the crown gear bear load over their full surface and thus do not have any undercut. The advantageous effects of the unnecessary undercut on the tooth-flank load-bearing capacity of the crown-gear teeth are evident.

Figure 1B:
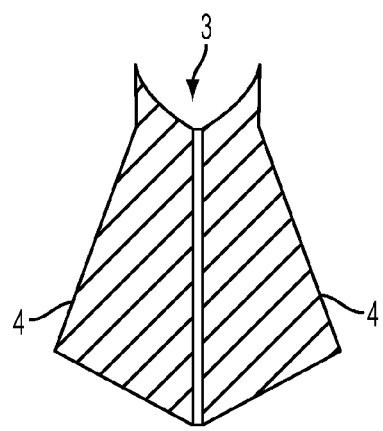
Figure 1C:
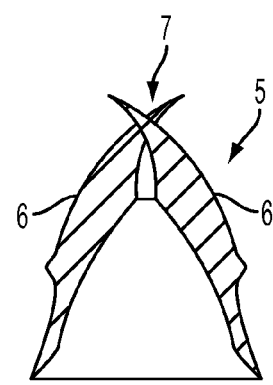
Figure 1D:
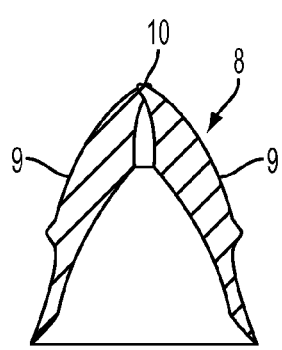
Figure 1E:
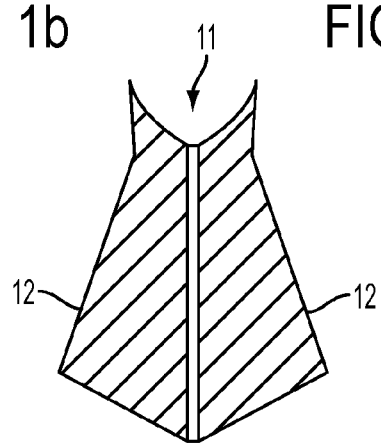
Figure 2:
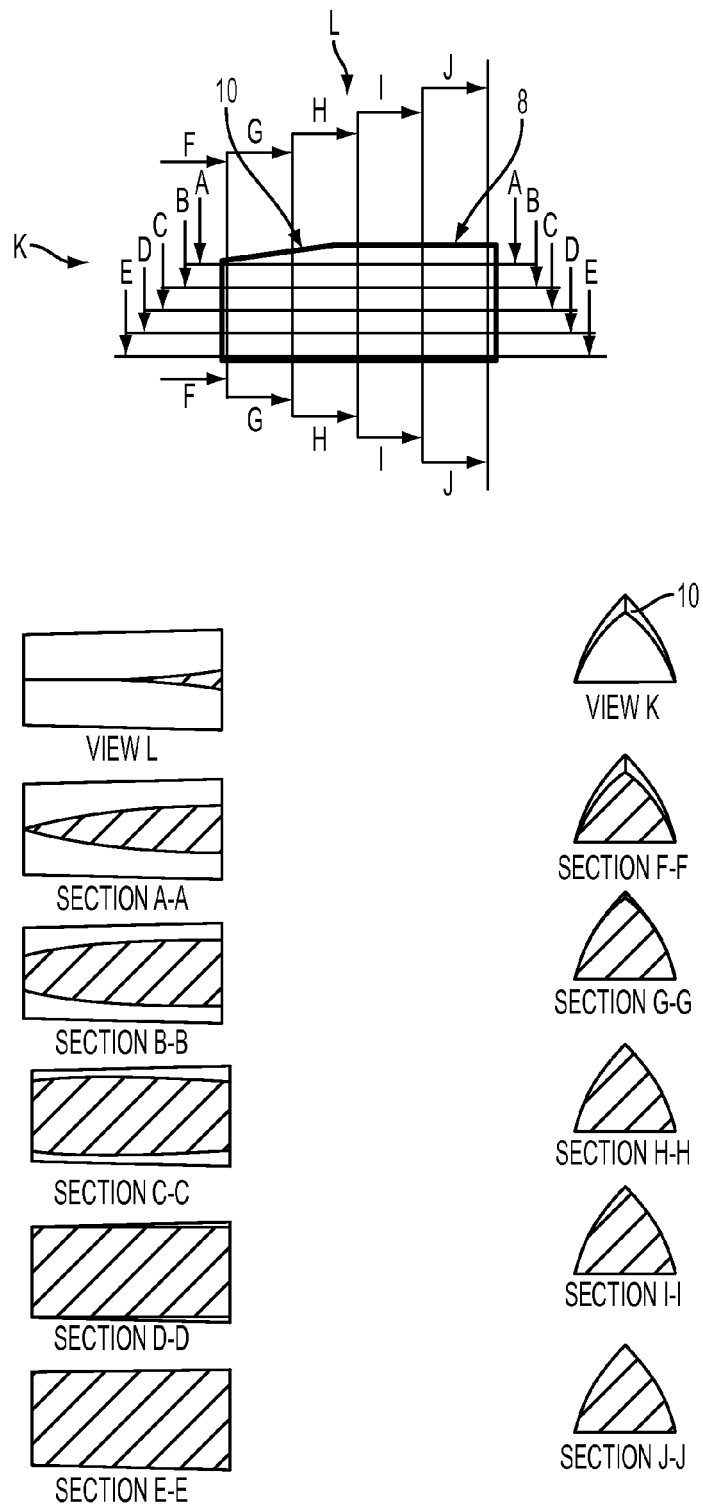
Figure 3:
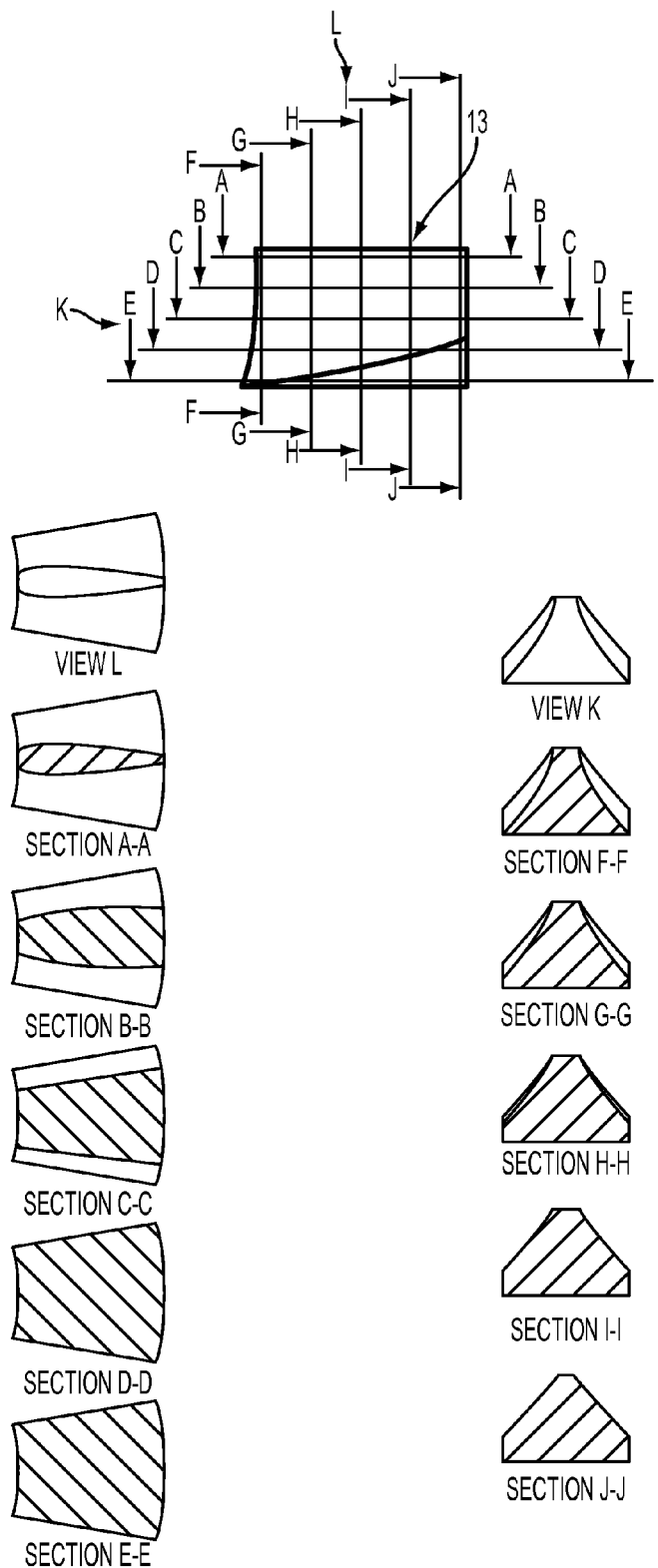

A practical example of the inventive method and of the inventive gear pair comprising crown gear and pinion will be explained in more detail hereinafter on the basis of the drawing, wherein FIGS. 1*a*, 1*c*, 1*d* each show a perspective view of a schematic diagram of the geometry of a pinion tooth that is obtained by execution of a practical example of the inventive method, FIGS. 1*b*, 1*e* each show a perspective view of a schematic diagram of the geometry of a crown-gear tooth gap that is obtained by execution of the practical example of the inventive method, FIG. 2 shows a diagram of a pinion tooth of a practical example of the inventive gear pair comprising crown gear and pinion in several cross-sectional diagrams, and FIG. 3 shows a diagram of a crown-gear tooth of a practical example of the inventive gear pair comprising crown gear and pinion in several cross-sectional diagrams.

FIG. 1*a* shows a schematic perspective diagram of a tooth 1 of the virtual pinion, whose geometry is predesignated in connection with execution of a practical example of the inventive method. The two tooth flanks 2 of illustrated virtual pinion tooth 1 have mutually symmetric form, and can have, for example, a decreasing profile displacement and an increasing pressure angle over their axial width. The limit conditions known for a pinion/crown-gear toothing, such as the taper limit and the interference limit, are advantageously met in this way.

FIG. 1*b*) then shows a schematic perspective diagram of a tooth gap 3 obtained between two adjacent teeth of the virtual crown gear by simulation of a half rolling cycle of the virtual pinion according to FIG. 1*a*. The two tooth flanks 4 bounding tooth gap 3 of the crown-gear toothing have mutually symmetric form and do not have any undercut, since the rolling cycle on which the calculation is based was ended when tooth 1 of the virtual pinion reached its symmetry position in tooth gap 3 of the toothing of the virtual crown gear.

FIG. 1*c* then shows a schematic view of the tooth flanks 6 of a pinion tooth 5, which flanks were obtained by reverse conjugate generation and exhibit excessive taper 7. This technically meaningless crossover of tooth flanks 6 is avoided by shortening tooth flanks 6 in the region of excessive taper 7.

FIG. 1*d* shows the resulting pinion tooth 8, whose geometry is defined as the final geometry of the pinion toothing. Tip shortening 10 is clearly evident. The resulting tooth flanks 9 have been shortened relative to tooth flanks 6 in the region of excessive taper 7. Starting from this pinion tooth, the geometry of a crown-gear toothing is then calculated by means of conjugate generation. A tooth gap 11 of this toothing is schematically illustrated in FIG. 1*e*, together with the two tooth flanks 12 of two adjacent crown-gear teeth bounding the tooth gap. Finally, this crown-gear toothing geometry, which substantially coincides with that of FIG. 1b, is defined as the final geometry.

FIGS. 2 and 3 then show diagrams of a pinion and crown-gear tooth respectively of a practical example of an inventive gear pair, whose toothing geometries were defined according to the method explained hereinabove.

In the diagram at top center, FIG. 2 shows a side view of a tooth 8 of the pinion, formed as a spur gear, of an inventive gear pair. Tip shortening 10 resulting from execution of the inventive method can be clearly recognized on pinion tooth 8.

To the left and below the side view of tooth 8 there is further illustrated an overhead view of tooth 8 along arrow L of the side view. Thereunder there are then presented the diagrams of sections A-A, B-B, C-C, D-D and E-E according to the section planes indicated in the side view. The shaded area in sections A-A to E-E represents the part of tooth 8 located in the respective section plane. Over their axial width, which is oriented from left to right in the respective sections, the tooth flanks of pinion tooth 8 are not straight but instead are curved, as is evident in particular from the clearly recognizable (convex) bulge in the region of the tooth tip in sections A-A and B-B. Furthermore, it can be seen from the overhead view of the tooth (view L) that the tooth flanks are also slightly curved in the region of the tooth root, whose shape is evident from the upper and lower bounding lines of view L, although in this case the tooth flanks have the form not of a bulge but rather of a slight (concave) indentation.

To the right and below the side view of tooth 8 there is further illustrated a view of tooth 8 according to arrow K of the side view. Tip shortening 10 can be clearly recognized here also. Thereunder there are presented diagrams of sections F-F to J-J through tooth 8, wherein the part of tooth 8 located in the respective section plane is again highlighted by shading.

In the diagram at top center, FIG. 3 shows a side view of a tooth 13 of the crown gear of an inventive gear pair, wherein the toothing has a form conjugate to that of the pinion toothing according to FIG. 2.

To the left and below the side view of tooth 13 there is further illustrated an overhead view of tooth 13 along arrow L of the side view. Thereunder there are then presented the diagrams of sections A-A, B-B, C-C, D-D and E-E according to the section planes indicated in the side view. The shaded area in sections A-A to E-E represents the part of tooth 13 located in the respective section plane.

To the right and below the side view of tooth 13 there is further illustrated a view of tooth 13 according to arrow K of the side view. Thereunder there are presented diagrams of sections F-F to J-J through tooth 13, wherein the part of tooth 13 located in the respective section plane is again highlighted by shading. In extremely advantageous manner, the tooth flanks of crown-gear tooth 13 do not have any undercut.

The invention claimed is:

1. A gear pair comprising:
a crown gear and a pinion, each comprising a respective set of teeth;
wherein the teeth of the crown gear and the pinion have mutually conjugate forms;
wherein flanks of the pinion teeth are curved over their width,
wherein the pinion teeth have a tip shortening over a width of the teeth, the tip shortening increases radially inward relative to the revolution of the pinion on the crown gear;
wherein flanks of the pinion teeth are convexly curved.

2. A gear pair of claim 1,
wherein flanks of the crown gear teeth are fully load-bearing and wherein the crown gear teeth are devoid of an undercut.

3. The gear pair of claim 1, wherein the teeth of the pinion comprise a constant tooth height.

4. The gear pair of claim 3, wherein the teeth of the pinion comprise a varying pressure angle.

5. The gear pair of claim 1, wherein the pinion teeth do not have an undercut.

* * * * *